TSMAN.
BEST AVAILABLE COPY
Sheet 1-3 Sheets.
J. Thorp.
No. 1693 X Loom.
Patented Mar. 28, 1812.
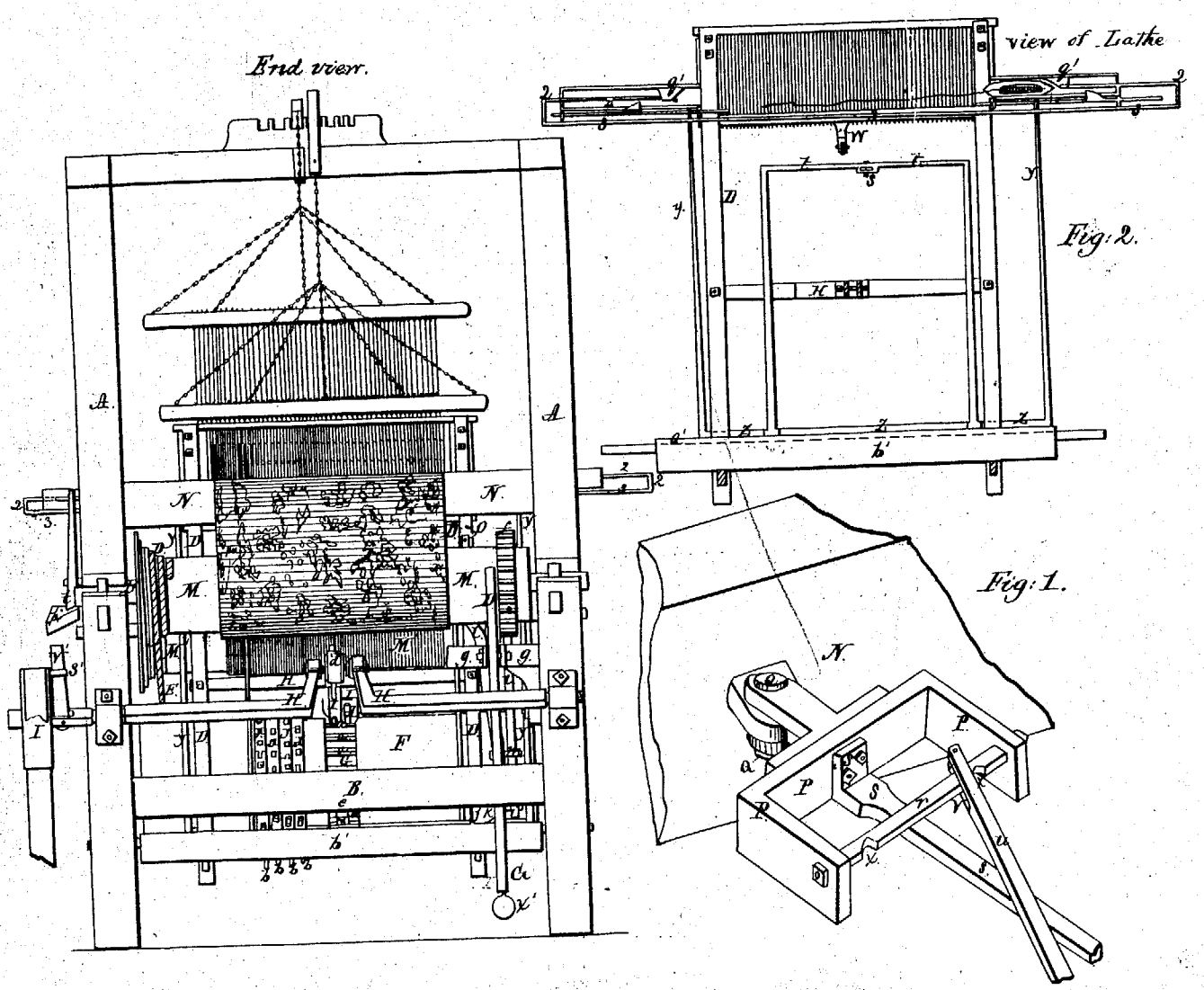
N. PETERS, PHOTO-LITHOGRAPHER, WASHINGTON, D.C.

RATTSMAN.
BEST AVAILABLE COPY
Sheet 2-3 Sheets.
No. 1693 X
J. Thorp.
Loom.
Patented Mar. 28, 1812.
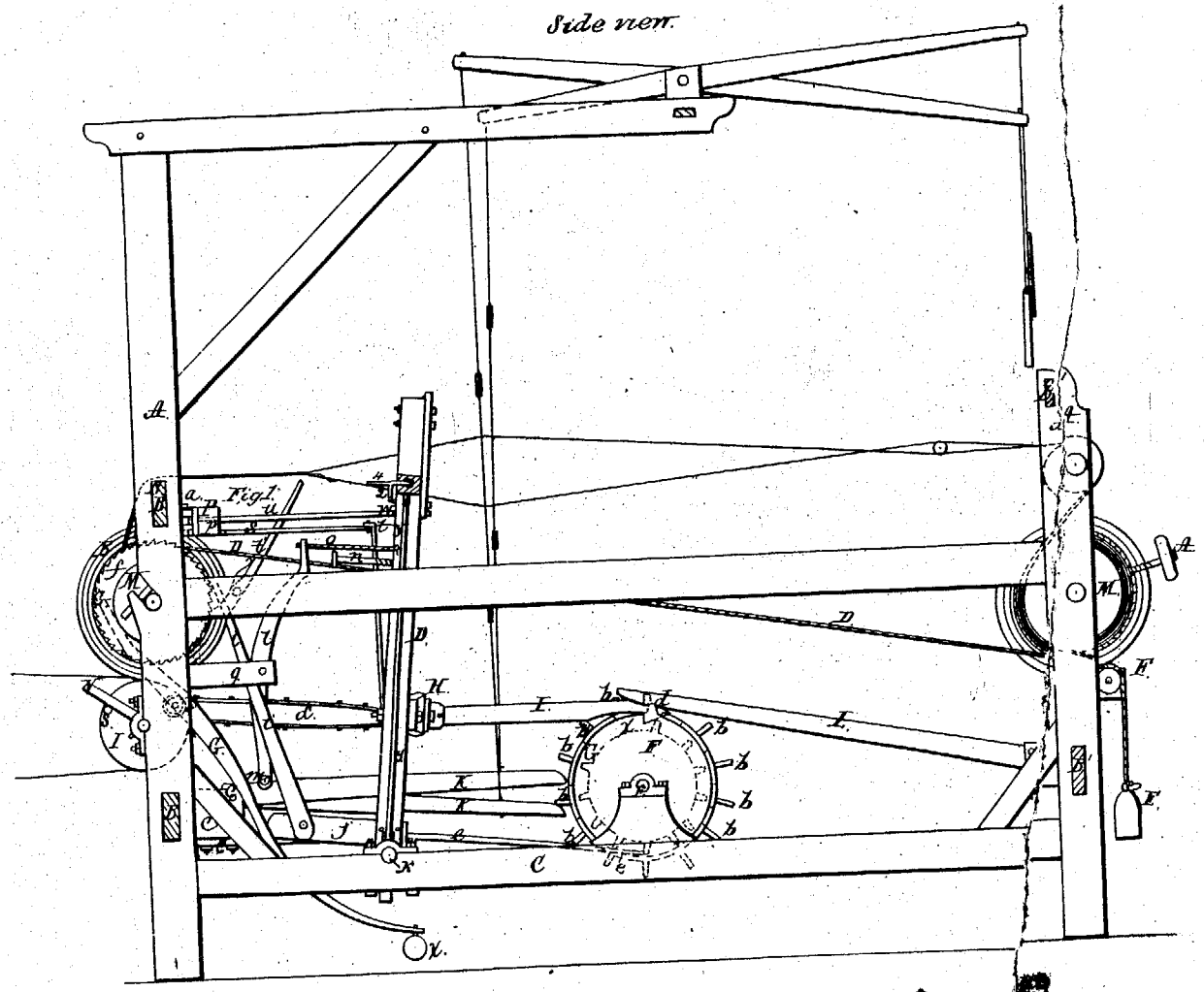
N. PETERS, PHOTO-LITHOGRAPHER, WASHINGTON, D. C.

139, TEXTILES, WEAVING.
78
ATTSMAN.
BEST AVAILABLE COPY
J. Thorp.
Sheet 3-3 Sheets.
Loom.
No. 1,693 X.
Patented Mar. 28, 1812.
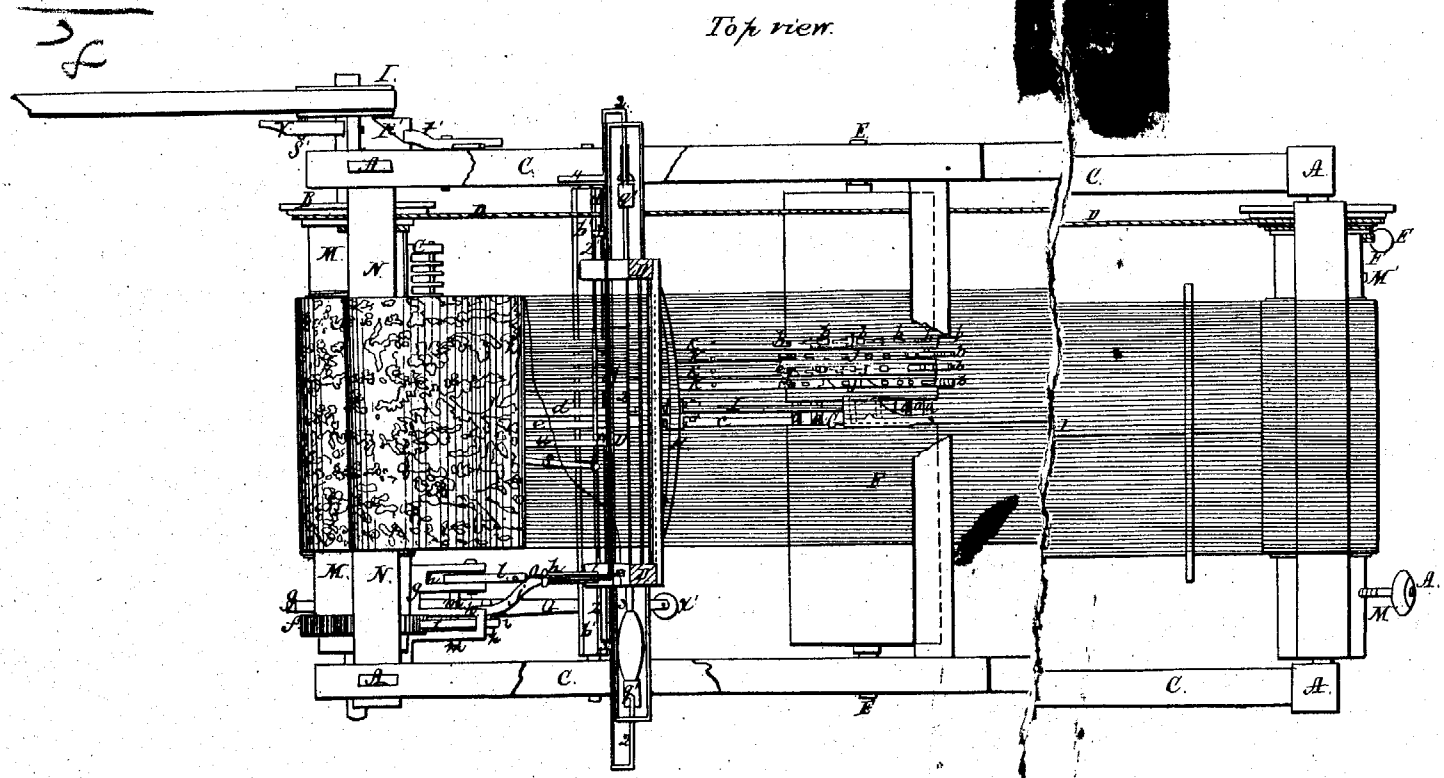
No 1693X
Class 139/78
N. PETERS, PHOTO-LITHOGRAPHER, WASHINGTON, D. C.

John Thorp — Letters Patent Dated March 28th 1812.

The Schedule referred to in these Letters Patent and making part of the same containing a description in the words of the said John Thorp himself of his Improved Hand and Water loom —

This Machine consists of four upright posts two front and two back girts and two girts on each side to connect said posts as in other looms.

The Lathe is a frame whose construction is some what like unto the lathe, of a common fly shuttle loom, it swings or turns upon pivots or gudgeons which are situated in the bottom side girts of the frame under the webb, so that the Slay at the top will nearly coincide with the under side of the webb, when sprung. The bottom side girts of the frame elevate the ends of a shaft of a wheel which I shall call the Treadle wheel, the said wheel has in it a score or a channel in which pins or coggs are fixed. There is a pliant and elastic piece that extends from one side piece of the Lathe to the other in which one end of a hook is confined that operates the Treadle wheel on the circumference of said wheel chains are placed for the purpose of shifting the treadle the said chains are screws whose length may be increased or decreased at pleasure to spring the webb a greater or less distance, and can be so shifted upon the wheel that various figures may be woven, or almost any number of treddles opperated. The Treaddles are hung in a block which is confined to the lower front girt of the frame, with their points extending to the wheel. The above mentioned hook catches up on the pins or coggs which are fixed in the wheel and are so many in number as of the chains, there is another hook or catch that prevents the motion of the wheel while the web is sprung. one end of which is confined to the back girt of the frame the other end has in it a notch and extends to the pins or coggs in the wheel, and is liberated by the first named hook as it passes back to gain another hold. There is another arm or prop which extends from the lower front girt of the frame just under the

1693X

[illegible] to the pins or cogs in the wheel to prevent the reaction of
it. The cloth beam is hung in the two front posts of the frame a
little below the breast beam, and has upon one end of it a ratchet. There
is a block which extends from the front post directly under the ratchet,
in whose [illegible] end is two mortices, through one of which passes a
[illegible] or [illegible], whose upper end extends to the teeth of the ratchet,
and its lower end hung by a pivot in a piece that projects from
the side piece of the Lathe, and nearly on a level with the pivot on which
the lathe swings and a proper distance from it to give a motion suffi-
cient to take up the cloth. There is in the other mortice a lever which
I shall call a regulating Lever hung on its middle for the purpose of
regulating the taking up of the cloth, the [illegible] being fixed to take up
the cloth too fast is liberated by a pin in the lower arm of the Lever
in consequence of its upper arm being moved by a screw in the side
piece of the Lathe when the cloth is beat beyond its limited position
the upper arm of this Lever is made fast to the Lathe by a string by
which it is returned to the lathe passes back and letting the feeder
fall on the ratchet after it has been liberated.

That which throws the Shuttle I shall call the Shuttle vibrator
it is affixed under the cloth in or near the middle of the breast beam swinging or
turning upon the pivot or gudgeons and is constructed with a plate
of metal in whose middle is a slit or mortice extending from one end
past its pivot or gudgeons and is constructed with a plate of mettle in
whose middle is a slit or a mortice extending from one end past its
pivot or gudgeons to the other, or its ends bent in which a rod or staple is
confined. There is confined to the said plate one end of an arm, the other
end of which extends under the bottom of the Lathe to its centre of motion
and is there fastened to the Shuttle drivers, or a rod on which they are con-
fined. There is another rod or a piece of Metal which I shall call
the Slider at one end of which is a mortice or hook calculated to slide or
[illegible] on the aforesaid rod or Staple, at or near each end of the said
rod or Staple is a notch on which the Slider catches to throw the Shuttle,
the other end of the said Slider is confined to a piece under the bottom of the Lathe. The said piece to which the said Slider is confined is pliant and elastic so as to render the first impulse not too abrupt on the Shuttle. The conductors of the Shuttle driver are Rods whose upper surface just clear the under side of the shuttle the said drivers are connected by a rod which slides in a channell that is cut in the bottom of the Lathe.

There is inserted into the cylinder or cylinders that suspends the harness one or more arms, the said arms are screws on whose out- er ends are weights to assist in springing the webb, for to strain the webb the_ is a line that passes round one end of the yarn Beam, and from that round one end of the cloth beam which has upon it a long whirr, whose grooves or channells begin at the bigness of the beam and increase in circumference untill they arrive at the big- ness of the intended rolls of cloth, the lower loop of the said line sustains a weight which hangs upon a pulley sufficient to strain the webb, the said line is shifted from one of the said channels to the other as the cloth fills up the beam.

To support against the blow of the Lathe there is a lever which I shall call the friction lever, hung by a pivot to the side gate of the frame whose short arm presses against the yarn Beam. the other arm of which suspends a weight and extends beyond the pivot of the Lathe and directly under the piece in which the [illegible] is hung, the said piece is [illegible] for the purpose of pressing down the long arm of the Lever causing a greater friction upon the beam when the lathe beats the cloth beyond its limited position when impelled by wa- ter the Lathe is vibrated by a crank which is situated in the two front posts of the frame, and is connected to the piece in which the said [illegible] is confined that speeds the [illegible] wheel, there is a pul- ley which plays loosely upon one end of the shaft of said crank and has in one side of it a pin or [illegible] which strike the end of an arm or Lever which is confined to the shaft of said crank by a Pivot. There is to the front post in range of the said pulley and arm a lever hung by its middle for the purpose of stopping the Loom the lower arm of the last mentioned Lever has upon it a three square piece on its end bent, the bevel of which is sufficient when ever it is moved to the point of the arm to cast it of off the pin or cogs and stop the loom. There is in each shuttle box a knee for the purpose of stopping the loom whenever the shuttle lodges in the web or misses the box one arm of each knee extends into the shuttle boxes, and is nearly parallel with them.

There is in each shuttle box a knee for the purpose of stop-ing the loom when ever the shuttle lodges in the web or misses the box, one arm of each knee extends into the shuttle boxes, and is nearly parallel with them —

The other arm of the said knees are connected by a rod, so that when one is moved by the shuttle the other will have the same operation.

An arm of one of the said knees is kept in range of the upper arm of the lever which stops the loom by a light spring and would unavoidably strike and move it, which would liberate the arm from the pin or cogs, if it was not moved in consequence of the shuttle striking the other arm of them, as it passes into the boxes. The friction of the said knees against the shuttle also prevents its recoiling —

Witnesses
N Dana jun^r
Christopher Burr

John Thorp (Drawing Made — N.W.P. 1846)

Ex.d
1196.

([illegible] [illegible] recorded a [illegible] Jan^y 28^th 1843) (1352 wds)